(12) United States Patent
Schmidt

(10) Patent No.: US 6,675,245 B1
(45) Date of Patent: Jan. 6, 2004

(54) APPARATUS AND METHOD FOR PROVIDING ROUND-ROBIN ARBITRATION

(75) Inventor: Jens Anton Thomsen Schmidt, Holstebro (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/831,874

(22) PCT Filed: Oct. 30, 1999

(86) PCT No.: PCT/EP99/08298

§ 371 (c)(1),
(2), (4) Date: May 16, 2001

(87) PCT Pub. No.: WO00/29963

PCT Pub. Date: May 25, 2000

(30) Foreign Application Priority Data

Nov. 17, 1998 (EP) .......................................... 981218035

(51) Int. Cl.[7] ............................................. G06F 13/368
(52) U.S. Cl. ..................... 710/111; 710/36; 710/119; 710/107
(58) Field of Search .................... 710/36, 107, 111, 710/119, 240, 242

(56) References Cited

U.S. PATENT DOCUMENTS

| | | |
|---|---|---|
| 5,072,363 A | 12/1991 | Gallagher |
| 5,392,033 A | 2/1995 | Oman et al. |
| 5,392,434 A | 2/1995 | Bryant et al. |
| 5,623,672 A | 4/1997 | Popat |
| 5,794,073 A * | 8/1998 | Ramakrishnan et al. ...... 710/40 |
| 5,881,313 A * | 3/1999 | Ramakrishnan et al. ...... 710/40 |

FOREIGN PATENT DOCUMENTS

EP   0286235 A2   10/1988

* cited by examiner

Primary Examiner—Xuan M. Thai

(57) ABSTRACT

The present invention provides round-robin arbitration between requests for access to a shared resource such as a data bus (7), shared by a plurality of hardware modules. A central counter (1) provides a count state bus (3) with cyclically altered count states. In each hardware module, the count state on the bus (3) is compared (4) with a count state associated with the hardware module. The output from the comparator (4) is used to enable the transmission of a request signal R to the central counter (1) and the transmission of a grant signal $G_i$ to the hardware module. The request signal R disables the clock signal C to the counter (1) and the grant signal $G_i$ grants access to the shared resource (7) from the hardware module. When the hardware module terminates its access to the resource (7) it deactivates the request signal R and the counter resumes cyclical counting. Hereby a simple arbitration of round-robin type is provided using simple logic gates and a counter.

13 Claims, 2 Drawing Sheets under the subject of the present invention.

APPARATUS AND METHOD FOR PROVIDING ROUND-ROBIN ARBITRATION

TECHNICAL FIELD

The present invention relates to an apparatus and a method for providing round-robin arbitration between requests for access to a shared resource such as a data bus, shared by a plurality of hardware modules, as mentioned in the preamble of claims 1 and 11, respectively.

BACKGROUND ART

Arbitration systems of this kind are normally configured in a so-called master-slave configuration, in which a module seeking access to the shared resource sends a request to the master module and the master module controls the arbitration by polling, sending grant signals to the requesting modules in a round-robin scheme. Communication is only possible between the master and a slave, not between slaves.

From U.S. Pat. No. 5,072,363 a system providing round-robin arbitration between requests for access to a shared resource such as a data bus, shared by a plurality of hardware modules is known, said system comprising a central counter cyclically driven between multiple count states by a clock, each count state being associated with a request for access to the shared resource by one of the plurality of hardware modules. In this system, the arbiter receives each individual request for access to the shared resource on separate request lines connected between the arbiter and the modules. Correspondingly, the arbiter grants access to the shared resource via separate grant lines connected between the arbiter and the modules. This involves at least two lines between the arbiter and each of the hardware modules. Furthermore, the arbitration is performed using a programmable array logic and a bus arbitration module and programming of the programmable array logic and the setup of input/output lines have to be individually adapted in accordance with the number of modules involved in each individual case, thereby reducing the flexibility of the system.

EP-0,286,235 describes arbitration in which the bus controller issues a "send" command and an "address" on the bus to be shared by the processors and the addressed processor responds by using the bus or by sending a NACK-signal on the bus. The processor has only access to the bus for a predetermined limited time period. Thus, this arbitration system is totally unsuited for controlling the access to e.g. a serial HDLC-bus, in which the time needed for sending an HDLC-frame can be considered stochastic.

DISCLOSURE OF THE INVENTION

It is the object of the present invention to provide an apparatus and a method of the above kind, which is of simple construction. This object is achieved with an apparatus as stated in claim 1 and a method as stated In claim 11. Hereby it is achieved that the arbitration can be implemented using a simple construction, including a simple counter, simple comparators and simple gates. Preferred embodiments of the invention are revealed in the sub-ordinate claims.

BRIEF DESCRIPTION OF THE DRAWINGS

In the following detailed part of the description, the Invention will be explained in more detail with reference to the exemplary embodiments of an apparatus and a method in accordance with the invention shown in the drawings, in which.

DESCRIPTION OF THE PREFERRED EMBODIMENTS

The arbitration apparatus shown in FIG. 1 comprises a N-bit counter 1 cyclically driven between multiple count states by a clock supplied to the counter via a gate 2, which will be described in more detail in the following. The N-bit output from the counter 1 is supplied to an arbitration bus with N-lines connected in parallel to all of the hardware modules sharing the shared resource which in the example is a HDLC-bus. Each of the modules comprises a comparator 4 for comparing the address set on the arbitration bus with its own address and the output from the comparator 4 is used to enable an internal grant signal $G_i$ and an external request signal R, respectively, whenever an internal request signal $R_i$ is set in the module in order to get access to the shared resource, i.e. the HDLC bus. The enabling of the grant and request signals, respectively, can be implemented using simple gates and the external request signal R is sent back to the gate for controlling the clock to the counter via an external request line connected in parallel to all of the modules. The gate 2 for controlling the clock for the counter 1 enables the externally supplied clock for counting as long as the external request signal is not activated by any of the modules. As soon as one of the modules, upon receipt of its own address on the arbitration address bus, activates the external request signal R, the clock to the counter is disabled and kept disabled until the module de-activates the external request signal R, by deactivating the internal request signal $R_i$, upon completion of its access to the shared resource.

In the embodiment shown, the shared resource is a serial HDLC communication bus and the receiving module is able to return handshake signals to the transmitting module via separate lines for acknowledge ACK, negative acknowledge NACK and not ready to receive NR. These signals are returned to the transmitting module to inform the transmitter about the success of the transmission of data on the HDLC bus. The access to the HDLC bus is not completed until these handshake signals are received back from the receiving module and accordingly, the transmitting module does not deactivate its request signal until such handshake signals are received. The protocol for access to the bus is preferably such that the transmitting module deactivates the request signal no matter what type of handshake signal is received and accordingly wait a certain period of time before trying to retransmit data which have not been properly received by the receiver.

Figure 1:
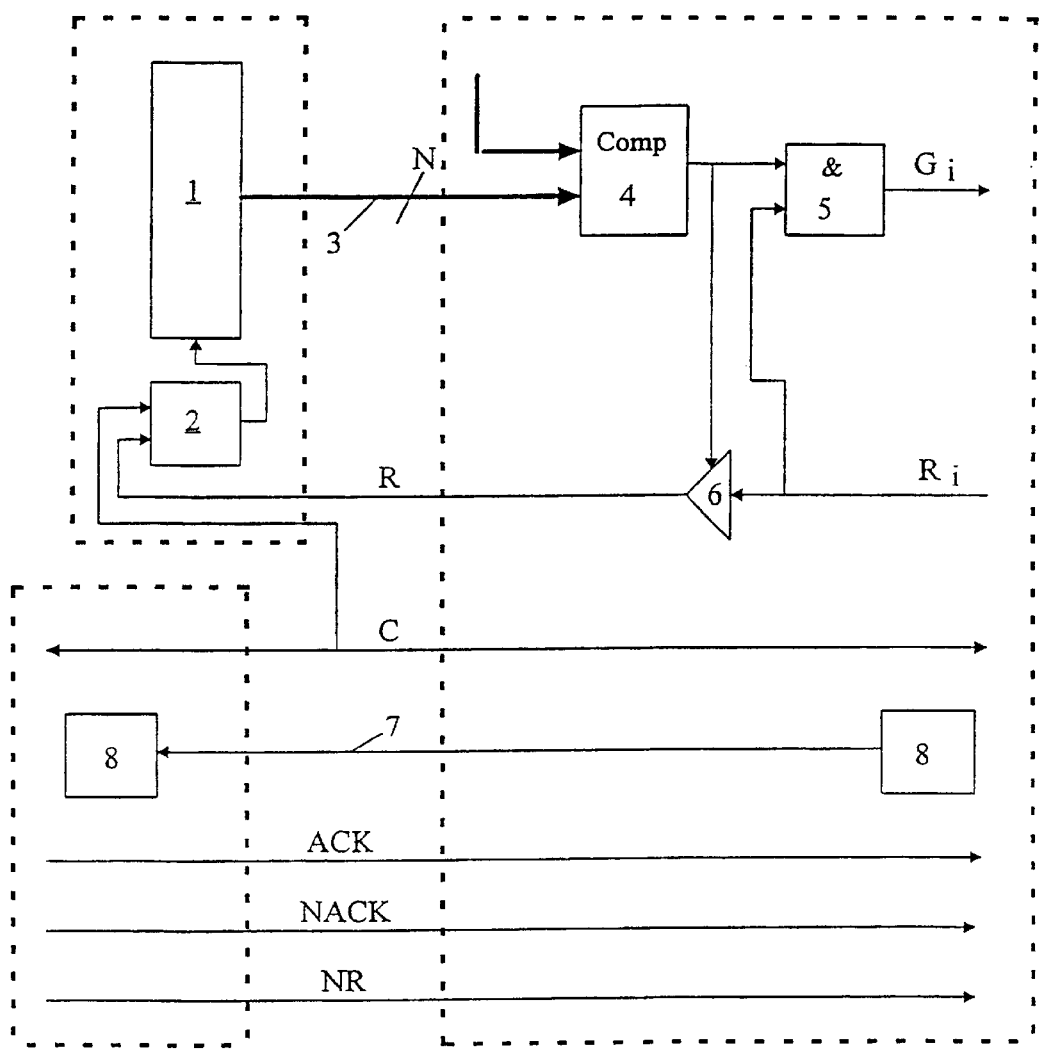
FIG. 1 shows an arbitration system for shared access to a HDLC data bus.
Figure 2:
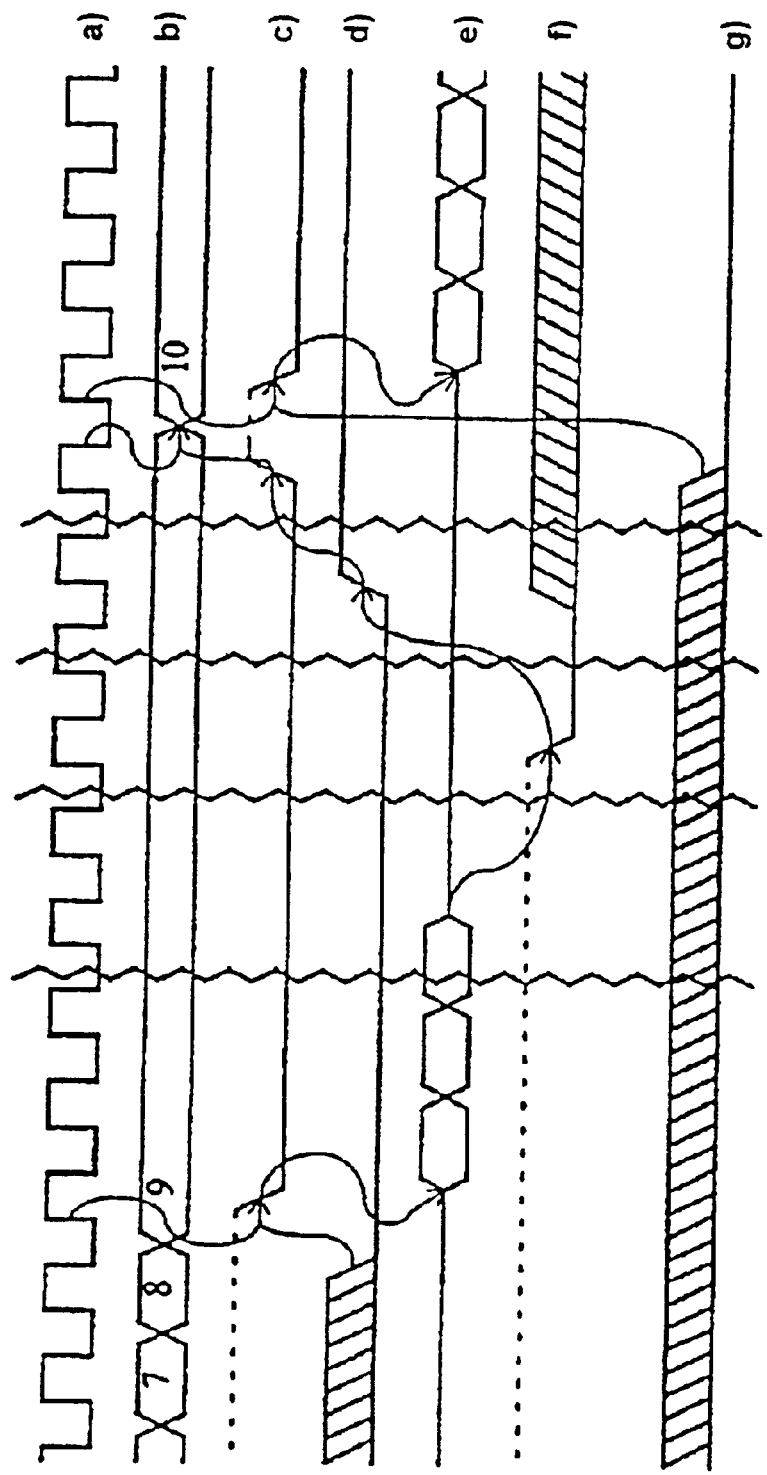
FIG. 2 shows a typical sequence of signals in the system shown in FIG. 1.

FIG. 2 shows a typical sequence of signals in the system shown in FIG. 1. From top to bottom the signals are as follows:

a) clock signal,
b) count state on bus 3 from counter 1,
c) external request signal R activated by any of the modules and disabling the clock C to the counter 1 by means of the gate 2,
d) internal request signal $R_i$ in the module with the own address 9,
e) symbolic representation of the data signal on the HDLC bus 7,
f) symbolic representation of any of the signals ACK, NACK and NR,
g) internal request signal $R_i$ from the module with the internal address 10.

In the situation sketched in FIG. 2, modules nos. 9 and 10 have data ready for transmission on the HDLC data bus and accordingly, these modules have set their internal request signals $R_i$ active. Starting from the left, the counter 1 is in the count state corresponding to the address 7 and counts on to addresses 8 and reaches 9, at which point of time the gate 6 in the module with the address 9 is enabled when the comparator 4 detects the address 9 on the counter state bus 3 from the counter. This enables the external request signal R which via the gate 2 disables the clock signal C to the counter 1. At the same time the gate 5 gets an internal grant signal $G_i$ to the module no. 9 whereby the module no. 9 starts sending data via the HDLC bus 7. When the module 9 has finished its data transmission on the HDLC bus 7, the HDLC controllers in the receiving module generate end of message interrupt and the receiver unit activates one of the lines ACK, NACK or NR to indicate the success or failure of receiving the data. The module no. 9 detects the activation of one of these handshake signals and following deactivates its internal request $R_i$, thereby deactivating the external request signal R, whereby the counter 1 resumes its counting and counts onwards to the address 10. The internal request signal $R_i$ is active in the module no. 10 and accordingly, this module sets the external request signal active when receiving the address 10 on the count state bus 3 from the counter. After this, the module no. 10 sends data on the HDLC bus 7 as just described for module no. 9.

As can be seen, the system in accordance with this embodiment provides equal access to the HDLC bus for each of the modules and a standard HDLC controller can be used to control the access to this HDLC bus with very simple external logic circuits.

Although the above system has been described with separate lines for the handshake signals, it is possible to use a software protocol for sending these handshake signals in separate frames on the HDLC bus, but this will naturally reduce the available bandwidth on the bus. Correspondingly, the external request signal may be sent back to the counter system using the HDLC bus, but this will increase the number of clocks necessary for polling each unit and consequently, also reduce the available bandwidth on the bus.

The invention has mainly been developed in order to provide a round-robin arbitration between loosely coupled hardware modules in a computer or digital telephone exchange, but a man skilled in the art will be able to make the necessary modifications in order to use the invention in many other situations where several hardware modules share a common resource.

The own address for each of the modules may naturally be allocated in accordance with the slot number in which an insert is inserted in a system, but may also be set in any other way, e.g. manually by means of dip-switches in each module.

What is claimed is:

1. Apparatus for providing round-robin arbitration between requests for access to a shared resource, such as a data bus (7), shared by a plurality of hardware modules, said apparatus comprising a central counter (1) cyclically driven between multiple count states by a clock C, each count state being associated with a request for access to the shared resource (7) by one of the plurality of hardware modules, characterized by comprising a count state bus (3) connecting the central counter (1) to each of the hardware modules for providing the count state to the hardware modules, each hardware module comprising a comparator (4) for comparing the count state on the count state bus (3) with the count state associated with the hardware module, the output from said comparator (4) being used to enable i) the transmission of an external request signal R to the central counter (1) and ii) the transmission of an internal grant signal $G_i$ to the hardware module, whenever the hardware module has a request $R_i$ for access to the shared resource, the external request signal R to the central counter (1) being used to disable (2) the clock signal C to the counter (1) and the internal grant signal $G_i$ being used to grant access from the hardware module to the shared resource (7) until the internal request signal $R_i$ is deactivated by the hardware module when terminating its access to the shared resource (7), thereby deactivating the external request signal R and enabling the clock signal C to the counter (1), whereby the counter resumes cyclically counting between the multiple count states.

2. Apparatus in accordance with claim 1, characterized by the central counter (1) being a N-bit counter, the count state bus being a N-line parallel bus and the number of hardware modules being less than $2_N$.

3. Apparatus in accordance with claim 1, characterized by the shared resource (7) being a data bus (7) for providing communication between the hardware modules.

4. Apparatus in accordance with claim 3, characterized by the data bus (7) being a HDLC bus.

5. Apparatus in accordance with claim 1, characterized by the external request signal being transmitted via a separate line, common to all the hardware modules.

6. Apparatus in accordance with claim 3, characterized by the external request signal R being transmitted via the data bus (7).

7. Apparatus in accordance with claim 1, characterized by further comprising separate connection lines for transmitting handshake signals ACK, NACK, NR between hardware modules.

8. Apparatus in accordance with claim 3, characterized by handshake signalling being performed via the data bus (7).

9. Apparatus in accordance with claim 3, characterized by being used in a computer or a digital telephone exchange.

10. Apparatus in accordance with claim 3, characterized by the counter state bus (3), possible external request signal line, handshake signal lines and data bus connections being implemented as a backplane bus.

11. Method for providing round-robin arbitration between requests for access to a shared resource (7), such as a data bus, shared by a plurality of hardware modules, said method comprising the following steps:

a) providing a central counter cyclically driven between multiple count states by a clock, b) associating each count state with a request for access to the shared resource by one of the plurality of hardware modules, characterized by further comprising the steps of:

c) in each hardware module, comparing the count state received from the counter with the count state associated with the request for access by the hardware module, d) when said states are coinciding and the hardware module is requesting access to the shared resource,
 i) transmitting a request signal to the central counter,
 ii) transmitting a grant signal to the hardware module, e) disabling the clock signal to the central counter when a request signal is received, f) the hardware module granted access accessing the shared resource until finished, and g) terminating the access by de-activating the request signal, whereby the counter resumes its cyclical counting between count states.

12. Method in accordance with claim 11, characterized by further comprising:

g1) handshake signalling before terminating the access in step g), in order to provide information regarding the success or failure of the access to the shared resource, and g2) terminating the access in accordance with step g), irrespective of the success or failure of the access, with possibility of accessing the shared resource later, if the access failed, as signalled in step g1).

13. Method in accordance with claim 12, characterized by comprising h) limiting the number of times a hardware module accesses the shared resource in the event of failure of the access.

* * * * *